United States Patent
Poulos et al.

(10) Patent No.: US 10,787,105 B2
(45) Date of Patent: Sep. 29, 2020

(54) REAR SEAT BACKREST WITH LIGHTWEIGHT ALUMINUM BACK PANEL

(71) Applicant: Adient Engineering and IP GmbH, Burscheid (DE)

(72) Inventors: Yannis Poulos, Sylvania, OH (US); Miodrag Petrovich, Ann Arbor, MI (US); Ryan Schilling, Canton, MI (US); Lucas Porinsky, South Lyon, MI (US); Edward J. Lamont, Livonia, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/468,942

(22) PCT Filed: Jan. 3, 2018

(86) PCT No.: PCT/US2018/012174
§ 371 (c)(1),
(2) Date: Jun. 12, 2019

(87) PCT Pub. No.: WO2018/129033
PCT Pub. Date: Jul. 12, 2018

(65) Prior Publication Data
US 2019/0329686 A1 Oct. 31, 2019

Related U.S. Application Data

(60) Provisional application No. 62/442,581, filed on Jan. 5, 2017.

(51) Int. Cl.
*B60N 2/68* (2006.01)
*B60N 2/20* (2006.01)
*B60N 2/64* (2006.01)

(52) U.S. Cl.
CPC ............... *B60N 2/682* (2013.01); *B60N 2/20* (2013.01); *B60N 2/64* (2013.01); *B60N 2/686* (2013.01)

(58) Field of Classification Search
CPC . B60N 2/682; B60N 2/20; B60N 2/64; B60N 2/686
See application file for complete search history.

(56) References Cited

U.S. PATENT DOCUMENTS

| 2,973,807 A | 3/1961 | Close |
| 5,505,520 A | 4/1996 | Frusti et al. |
| (Continued) | | |

FOREIGN PATENT DOCUMENTS

| DE | 102011001522 A1 | 9/2012 |
| WO | 2013171180 A1 | 11/2013 |

OTHER PUBLICATIONS

European Patent Office, Supplementary European Search Report in application No. EP 18 73 6465, dated Dec. 2019, 7 pages, Munich Germany.

*Primary Examiner* — Philip F Gabler
(74) *Attorney, Agent, or Firm* — Marshall & Melhorn, LLC

(57) ABSTRACT

A vehicle seat assembly is provided including a back panel formed of an aluminum alloy material that is stamped to form an aluminum alloy stamped back panel. The aluminum alloy stamped back panel has a periphery and with fastening locations inwardly of the periphery. A backrest frame is provided comprising steel tubes. A plurality of fastening connections fix the back panel to the backrest frame at the fastening locations. A process is provided for forming a vehicle seat assembly including stamping an aluminum alloy sheet to form an aluminum alloy, stamped, back panel with a periphery and with fastening locations inwardly of the periphery, providing a backrest frame comprising steel (Continued)

tubes, providing a plurality of steel fasteners and fixing the aluminum alloy stamped back panel to the backrest frame with the fasteners at the fastening locations.

16 Claims, 8 Drawing Sheets

(56) References Cited

U.S. PATENT DOCUMENTS

| | | | |
|---|---|---|---|
| 5,720,511 A | 2/1998 | Benedyk | |
| 6,227,433 B1 | 5/2001 | Waldron et al. | |
| 6,347,836 B1 | 2/2002 | Hayotte | |
| 6,981,748 B2 | 1/2006 | Garnweidner et al. | |
| 7,021,937 B2 * | 4/2006 | Simpson | A63F 13/08 434/62 |
| 7,862,122 B1 * | 1/2011 | Shammas | B60N 2/787 297/411.23 |
| 9,944,356 B1 * | 4/2018 | Wigley | B63B 1/24 |
| 2003/0218053 A2 | 11/2003 | Litwinski et al. | |
| 2004/0051262 A1 * | 3/2004 | Young | B62K 5/00 280/7.12 |
| 2006/0174433 A1 * | 8/2006 | Schnettgoecke | B65F 1/02 15/84 |
| 2006/0213954 A1 | 9/2006 | Ruther et al. | |
| 2008/0258520 A1 | 10/2008 | Uchida | |
| 2008/0303245 A1 * | 12/2008 | Schraeder | B62D 63/064 280/400 |
| 2010/0244538 A1 | 9/2010 | Gross et al. | |
| 2011/0163587 A1 | 7/2011 | Kmeid et al. | |
| 2013/0015693 A1 | 1/2013 | Tosco | |
| 2013/0285428 A1 * | 10/2013 | Livesey | B60N 2/06 297/317 |
| 2015/0211085 A1 * | 7/2015 | Harris | C22C 38/00 297/452.18 |
| 2016/0176318 A1 * | 6/2016 | Poulos | B60N 2/065 297/235 |

* cited by examiner

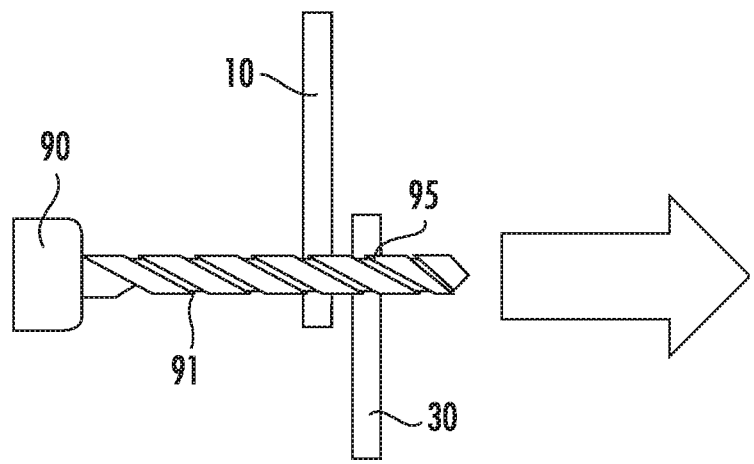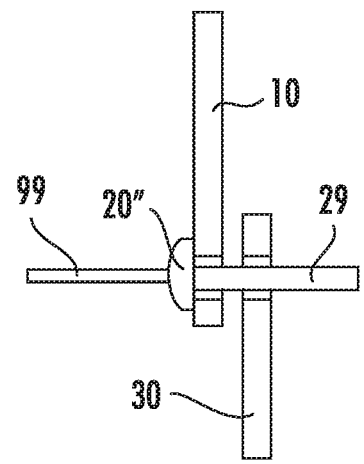
FIG. 13A    FIG. 13B
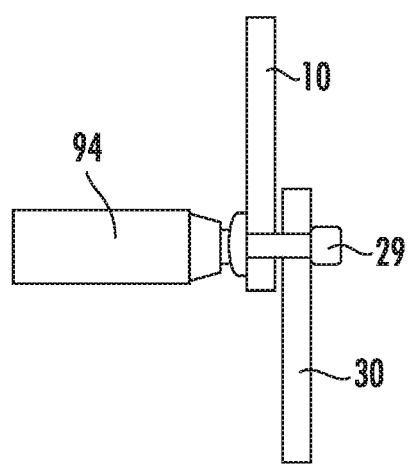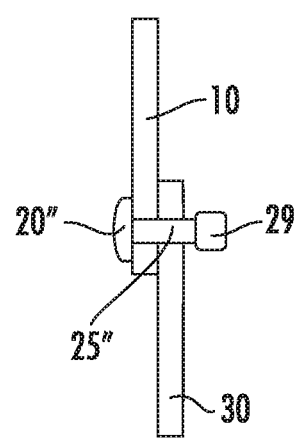
FIG. 13C    FIG. 13D

REAR SEAT BACKREST WITH LIGHTWEIGHT ALUMINUM BACK PANEL

CROSS REFERENCE TO RELATED APPLICATIONS

This application claims the benefit of priority of U.S. provisional application 62/442,581, filed Jan. 5, 2017, the entire contents of which are incorporated herein by reference.

FIELD OF THE INVENTION

The present invention relates to the field of vehicle seats, and in particular to rear vehicle seats, such as second row and third row vehicle seats, with a backrest (also known as a seat back or a recliner) which pivots forward and folds flat to become a cargo load floor.

BACKGROUND OF THE INVENTION

A significant percentage of vehicles (CUVs & SUVs), have a rear seat (second row and third row) with a backrest which pivots forward and folds flat to become a cargo load floor. The vehicle seat backrest may utilize a back panel, in combination with a backrest frame. The back panel is utilized for load floor strength and for a deflection of the permanent seat under cargo load requirements. The back panel meets regulatory seat strength requirements, occupant support requirements.

Rear seat back panels are typically either thin steel or thick hardboard. In the past one would find steel back panels on CUV/SUV seats. This is due to steel back panels being best to handle the above described requirements. The steel back panels are welded to the structural steel welded back frame, via resistance and laser welds. Such steel back panels can have a U-channel formed around a back panel periphery. With such a U-channel, the carpet on the rear side of the backrest, can be attached providing a crisp closeout.

SUMMARY OF THE INVENTION

An object of the present invention is to provide a vehicle seat, preferably a rear vehicle seat, with a back panel which is robust, rigid, complies with requirements and which is lighter than known back panels.

A further object of the invention is to provide a connection between dissimilar materials. In particular, it is an object of the invention to provide a connection of an aluminum back panel to a steel welded back frame (backrest frame) assembly and to provide a connection method for effectively fixing the aluminum back panel to the steel welded back frame.

According to the invention, a lightweight rear seat back frame solution is provided with a steel tube backrest frame with a thin stamped aluminum back panel fixed to the steel tube backrest frame.

The aluminum material (an aluminum alloy) and the low thickness of the back panel are a combination that represents approximately a 25% mass reduction over typical thin steel back panels. The steel welded back frame assembly advantageously is provided with the aluminum back panel which is essentially rectangular shaped and thin with a U-profile at portions of a periphery thereof.

According to a further aspect of the invention, fasteners are provided for mechanically fixing the aluminum back panel to the steel tube backrest frame.

The fasteners may be provided as mechanical connections, in particular rivets, that attach the back panel to the steel back frame. According to a further advantageous feature, the fasteners are provided with shafts passing through an opening in the aluminum back panel with a shaft end welded to the tubes of the steel back frame. This is particularly advantageous as it provides a steel to steel weld connection. Further, the fasteners include flanged heads that extend radially outwardly from the fasteners shaft over a region of the aluminum back panel at the periphery of the opening in the aluminum back panel. This provides a mechanical connection and in particular a clamping of the aluminum back panel to the tubes of the back panel frame. These rivets or welded fasteners are fixed to the flat surface of the rectangular thin tube. The thin steel tube is disposed forward (with respect to a direction of travel and based on a forward directed seat) of the aluminum back panel.

The connection creates a secure welded and clamped or riveted connection between the back panel and steel frame. The head of the welded fastener or the rivet clamps the aluminum back panel to the steel back frame. This is done by clamping the back panel underneath the fastener/rivet head.

According to the invention, a vehicle seat assembly is provided comprising a back panel comprising an aluminum alloy sheet which is stamped to form an aluminum alloy stamped back panel. The aluminum alloy stamped back panel has a periphery and has fastening locations inwardly of the periphery. A backrest frame is provided comprising steel tubes. A plurality of fastening connections fix the back panel to the backrest frame at the fastening locations.

The aluminum alloy stamped panel may comprise a U-channel provided along at least a portion of the periphery with planar regions and raised stamped portions provided inwardly of the periphery.

Each fastening connection advantageously comprises a panel passage opening through the aluminum alloy stamped panel and a fastener formed of steel. The fastener may advantageously comprise a fastening head and a fastener shaft with an end of the fastener shaft fixed to one of the steel tubes of the backrest frame. The fastening head extends radially outwardly from the shaft and includes a contact surface mechanically engaging a surface of the aluminum alloy stamped panel. The shaft head cooperates with the fixed fastener shaft end to clamp the aluminum alloy stamped panel to the backrest frame. The fastener shaft may have a friction welded end, friction welded to the one of the steel tubes of the backrest frame. The fastener shaft may alternatively have a resistance welded end, resistance welded to the one of the steel tubes of the backrest frame. Further, instead of a welded end, the fastener may comprise a rivet terminated end including a contact surface mechanically engaging a surface of one of the steel tubes of the backrest frame. In this case, each fastening connection further comprises a steel tube passage opening through the one of the steel tubes of the backrest frame. The shaft passes through the panel passage opening and the steel tube passage opening, whereby the rivet clamps the aluminum alloy stamped panel to the steel tube backrest frame.

The aluminum alloy may advantageously be an aluminum alloy in the 5000 series or the 6000 series with a T0-T5 tempering. The aluminum back panel may advantageously have a thickness of between 0.95-0.75 mm. The aluminum back panel may advantageously be between 0.87 and 0.67 Kg and preferably about 0.72 Kg. Other alloys may be used including a magnesium alloy (an alloy with substantially more magnesium than the aluminum alloys listed).

According to a further aspect of the invention, a process is provided for forming a vehicle seat assembly. The process comprises the steps of:

stamping an aluminum alloy sheet to form an aluminum alloy stamped back panel with a periphery and with fastening locations inwardly of the periphery;

providing a backrest frame comprising steel tubes;

providing a plurality of steel fasteners; and fixing the aluminum alloy stamped back panel to the backrest frame with the fasteners at the fastening locations.

It is apparent that the above-described features, which will also be explained below, can be used not only in the particular combination described, but also in other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 13A is a schematic side view showing a stage of a rivet joining process;

FIG. 13B is a schematic side view showing another stage of a rivet joining process;

FIG. 13C is a schematic side view showing another stage of a rivet joining process; and FIG. 13D is a schematic side view showing another stage of a rivet joining process.

DESCRIPTION OF THE PREFERRED EMBODIMENTS

Figure 1:
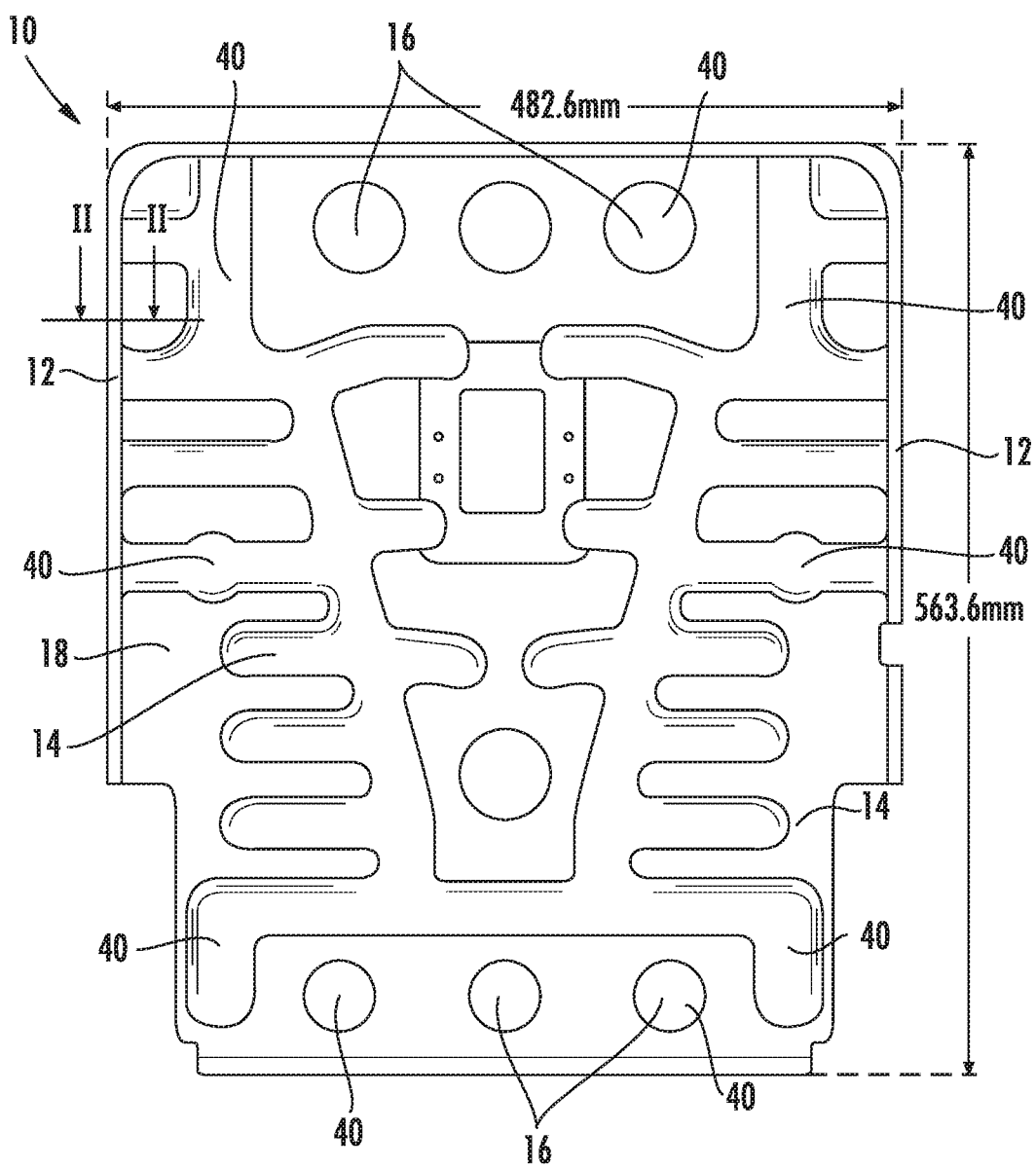
FIG. 1 is a front view of an aluminum back panel according to the invention.
Figure 2:
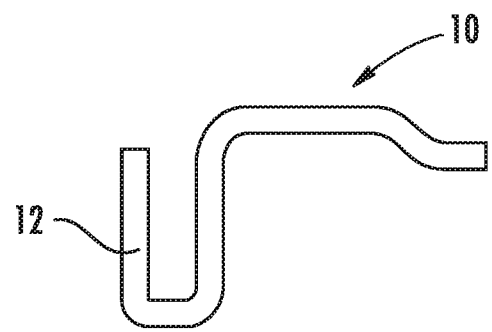
FIG. 2 is a partial sectional view taken along line II-II of FIG. 1.
Figure 3:
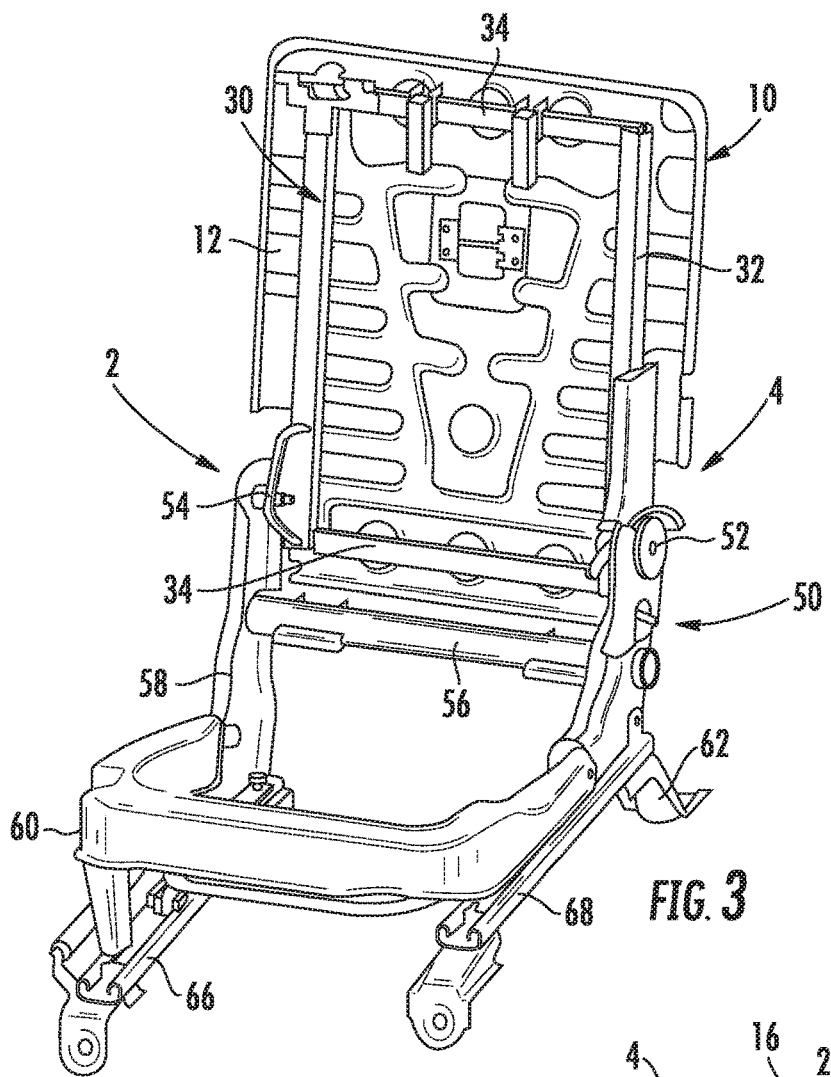
FIG. 3 is a perspective view of a vehicle seat according to the invention, showing the vehicle seat in a use position and without trim and without foam.
Figure 4:
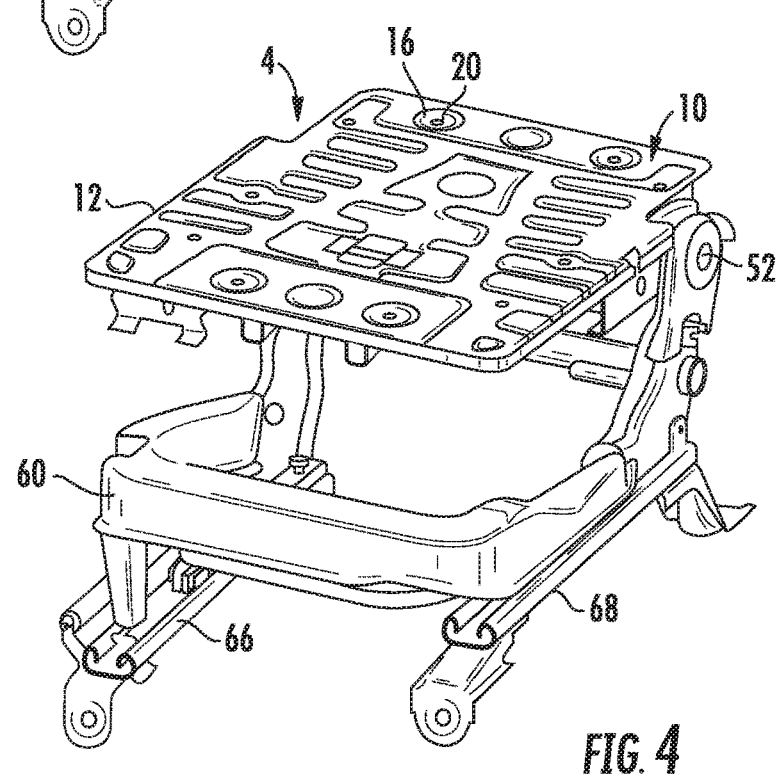
FIG. 4 is a perspective view of the vehicle seat of FIG. 3, showing the vehicle seat in a folded forward position and again without trim and without foam.
Figure 7:
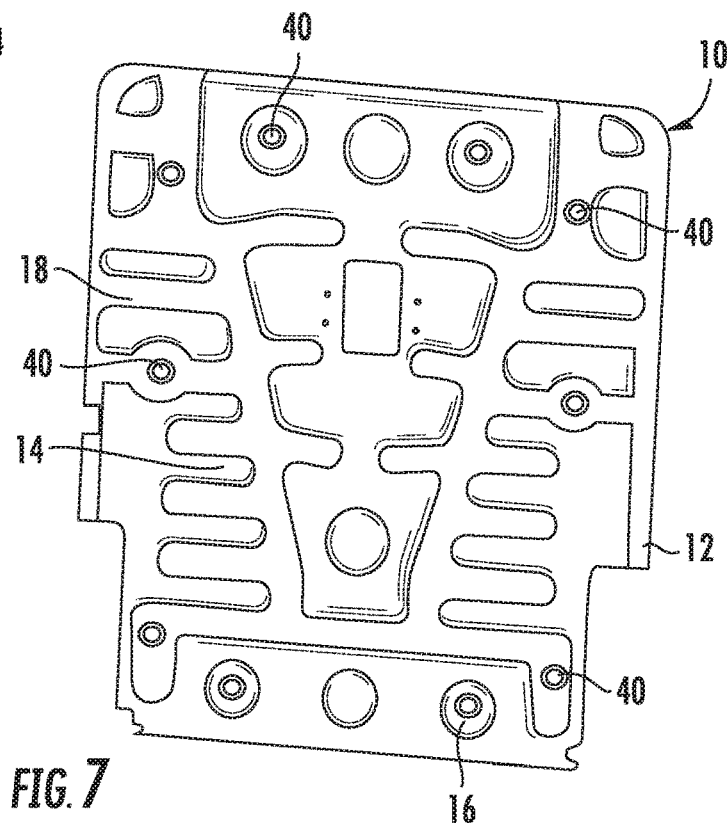
FIG. 7 is a perspective rear view showing the back panel of FIG. 5, indicating the fastener openings with adjacent opening peripheral back surface of the back panel.

Referring to the drawings, FIG. 1 shows an aluminum alloy back panel generally designated 10. The back panel 10 is formed with one stamping to provide a U-channel 12 along a substantial portion of a periphery of the back panel 10. The U-channel 12, particularly adds rigidity and stiffness to the overall structure of the back panel 10. The one stamping also provides raised portions including raised ribs 14 and raised circular regions 16. These raised portions 14 and 16 are provided with intervening planar regions 18. Fastening locations 40, preferably in the form of rivet through holes or pilot through holes are provided in some of the raised portions. The through holes 40 are particularly indicated in FIG. 7.

The back panel 10 is provided as part of a backrest frame (seat back frame) assembly with a steel tubular frame 30. The seat back frame assembly is a part of a backrest frame 4 and is provided in combination with vehicle seat parts to provide a vehicle seat generally designated 2.

The steel tubular frame 30 is comprised of lateral steel frame tubes 32 and backrest horizontal steel frame tube 34. A vehicle seat with a similar backrest steel tube frame is disclosed in International Patent Application PCT/US2017/016170, filed Feb. 2, 2017, which is incorporated by reference herein in its entirety.

A recliner arrangement 50 and a side bracket 58 with recliner pivot 54 connect to the back panel 10 and steel tubular frame 30 of the backrest frame assembly. The recliner arrangement 50 includes a recliner/fold forward fixture 52. The fixture 52 provides reclining adjustment of the backrest 4. The fixture 52 pivots the back panel 10 and steel tubular frame 30 of the backrest frame assembly to allow the backrest 4 to be set in any of a plurality of recliner positions and an upright position. The fixture 52 also allows a forward pivoting of the backrest 4 to a fold flat position. The robust and rigid nature of the back panel 10 allows the back panel 10, in the fold flat position, to function as a cargo load floor. The vehicle seat 2 also includes a cross tube 56 connecting the recliner arrangement 52 the side bracket 58. A seat cushion frame 60 is connected to the side bracket 58 and recliner arrangement 52 and is in turn also connected to vehicle floor bracket 62 via position adjustment track 66 and 68. Although a particular vehicle seat 2 is disclosed, the back panel 10 and steel tubular frame 30 frame assembly may be used with other vehicle seat configurations.

Figure 5:
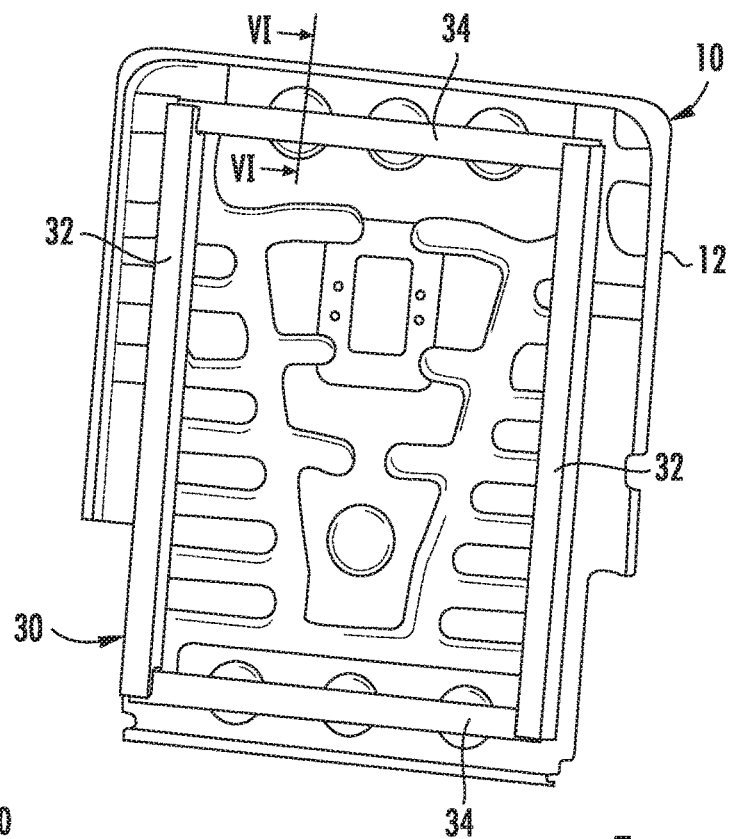
FIG. 5 is a perspective front view showing a back frame and back panel assembly according to the invention.
Figure 6:
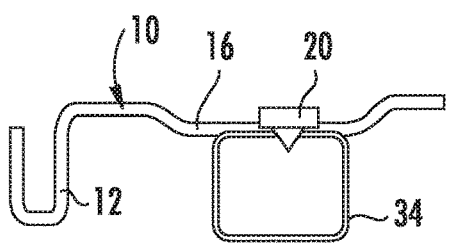
FIG. 6 is a partial sectional view taken along line VI-VI of FIG. 5.

As can be seen in FIG. 5, the back panel 10 and steel tubular frame 30 frame assembly forms a unitary rigid back frame assembly structure based on a combination of steel (steel alloy) components 32, 34 and aluminum (aluminum alloy) back panel 10. Each lateral steel frame tube 32 and each horizontal steel frame tube 34 is mechanically connected by a fastener 20 to the back panel 10. The fasteners 20 each pass through a respective one of the fastening locations/openings 40. Each of the horizontal frame tubes 34 is mechanically connected to the fasteners 20 by welding or by a rivet connection as discussed below. Each fastener 20 includes a flange fastener head 22 to mechanically fasten the back panel 10 to the steel tubes 32 and 34 of the steel tube frame 30. The plurality of fastening locations or through openings 40 are pre-formed in the back panel 10. These may be formed during stamping or during a subsequent drilling process. The fasteners 20, mechanically connected to the backrest steel tube frame 30, extend through the fastening locations 40 with the fastening head 22 of the fastener 20 extending radially outwardly of the fastening locations. The fastening heads contact an opening peripheral back surface of the back panel 10. This provides a clamping together of the backplane 10 and the backrest steel tube frame 30. The clamping action provided by the engagement of the fastening head 22 and the surface of the back panel 10 allows the fastener 20 to be formed of steel. In particular, the clamping mechanical connection provided by the fastener had 22 avoids the need for a welding or bonding of the aluminum alloy/magnesium alloy back panel 10 to the steel tube frame 30 or to the steel fastener 20.

aluminum alloy 5754 T0. Other particularly suitable aluminum alloys are aluminum alloy 6021-6022 T0. The back panel 10 preferably has a thickness in the range of 0.95-0.75 mm (+/−0.05 mm). Such an aluminum alloy material and thickness are particularly advantageous with regard to stamping. The back panel 10 is provided with good rigidity and stiffness with raised ribs 14, circular portion 16, intervening planer regions 18 and U-channel 12. The U-channel 12 advantageously extends around corners of the aluminum back panel 12 and is advantageous with regard to providing trim clearance. The pattern of raised and planar portions may be varied to provide rigidity and stiffness characteristics.

The aluminum alloy back panel 10 provides particular advantages. The aluminum back panel 10 has a lower mass compared to typical thin, steel back panel. Advantageously, the back panel 10 itself is between 0.87 and 0.67 Kg and preferably about 0.72 Kg. The aluminum back panel 10 is still quite thin based on a preferred material thickness <0.95 mm. This allows a conventional stamping process to be used to provide a structure comparable to a steel alloy back panel. Further, the aluminum alloy back panel 10 meets the same regulatory and automotive customer requirements as the steel back panel. Table I below provides a comparison as to attributes:

TABLE I

| Attribute | Steel Back panel | Aluminum Back panel | Comment |
| --- | --- | --- | --- |
| Material Type | HSLA (High Strength Low Alloy) Steel | Aluminum Alloy, 5754-T0 5000-6000 series T0-T6 Tempering | Matching Stiffness |
| Material Thickness | 0.55-0.45 mm (+/−0.05 mm) | 0.95-0.75 mm (+/−0.05 mm) | Matching Stiffness |
| Mass for Typical Single Occupant Seat Back Panel | 0.95 Kg | 0.72 Kg | Approximately 25% Reduction in mass |
| Technical Attributes | Stamping Formability Carpet Channel Load Floor Strength Regulatory Requirements | Stamping Formability Carpet Channel Load Floor Strength Regulatory Requirements | Aluminum Back panel Technical Attributes must be Equal or Better than Steel |
| Connection Between Back Panel & Steel Back frame | Welding Laser, RSW, GMAW | Connections according to the invention | Connection between Dissimilar materials, Aluminum Back panel & Steel Back frame |

The welded fastener 20, 20' includes a fastener shaft 25, 25' (FIG. 9, FIG. 11) extending from the fastener head 22, 22'. The fastener shaft 25, 25' may be advantageously welded to the tubes 32 and 34 to provide a steel/steel weld connection 24, 24'. In the alternative, tubes 32 and 34 may be provided with rivet through openings for a rivet fastener 20". The rivet fastener 20" has a rivet shaft 25" that passes through both the opening 40 of the aluminum backplane 10 and also trough a formed rivet through opening 95 in the steel respective tubes 32 and 34. The fastening end of the shaft 25" of the rivet fastener 20" is expanded to form an expanded end 29 providing a mechanical holding at a inner tube wall side of tubes 32 and 34 and at the opposite back side of the back panel 10.

The aluminum back panel 10 is preferably an aluminum alloy of the 5000-6000 series with T0-T6 tempering. For example, the aluminum back panel 10 advantageously is The back panel 10 and the steel tube back frame 30 may advantageously be fixed together to form the back frame with steel fasteners 20 and 20' that are welded with the steel tube back frame 30 to form a steel to steel/steel weld 24, 24'. This is a steel/steel weld connection 24, 24' that allows the back panel 10 to be clamped to the back frame 30. As noted above, the clamping action is provided by the fastener head 25, 25' being pressed on an opening peripheral back surface 42 surrounding each through opening 40. Two types of steel/steel welds 24, 24' are believed to be particularly advantageous. Resistance welding is discussed below with reference to steel fastener 20 and friction welding is discussed below with reference to steel fastener 20'.

Resistance Weld Fastener

Figure 8:
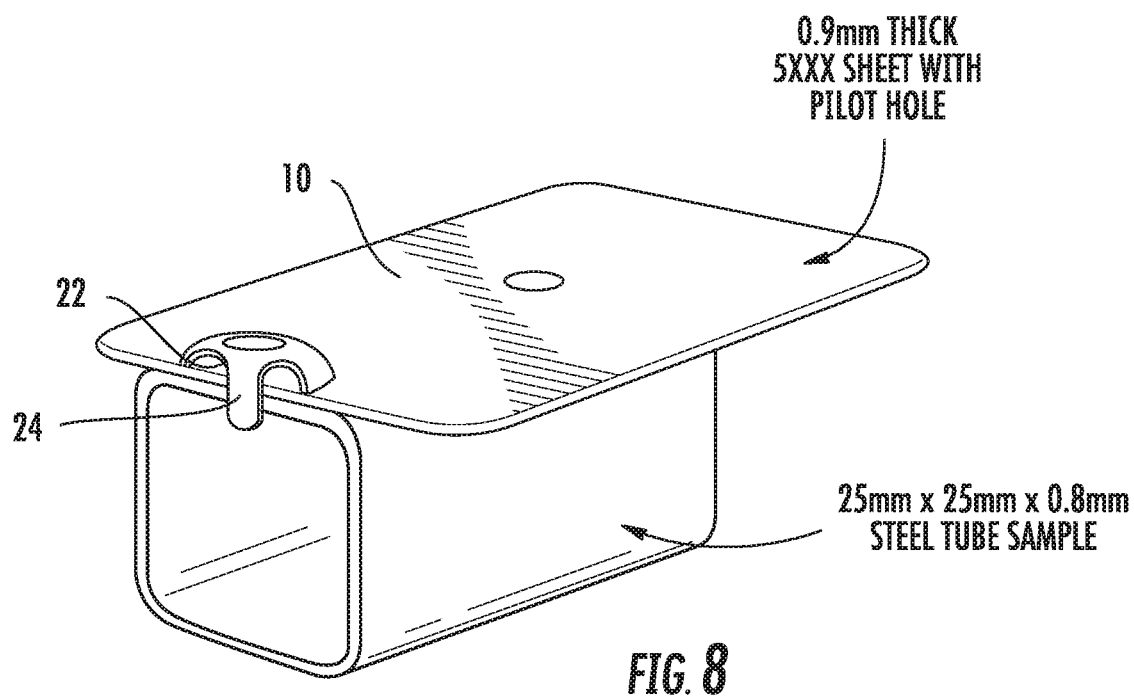
FIG. 8 is a perspective view showing a sample aluminum back panel portion and sample steel tube back frame portion fixed together with a fastener which is resistance welded to the sample steel tube back frame portion and with a flanged fastener head mechanically clamping the sample aluminum back panel portion to the sample steel tube back frame portion.
Figure 9:
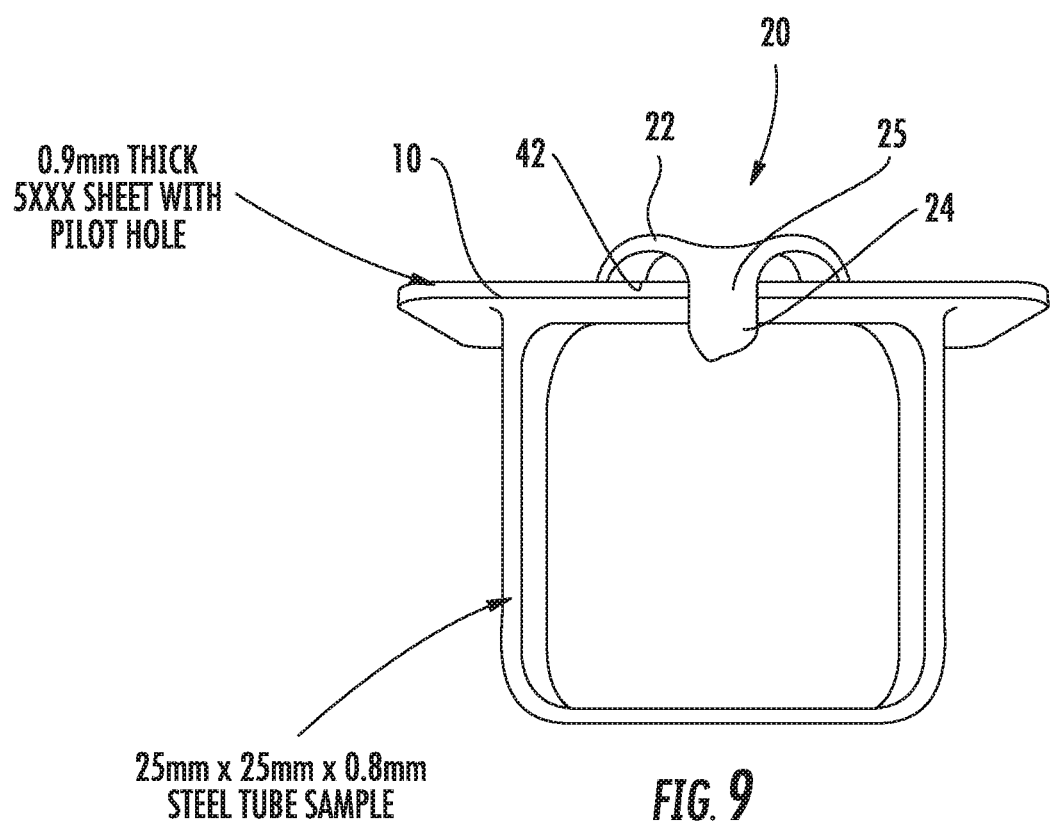
FIG. 9 is a sectional view of the connected parts of the view of FIG. 8.
Figure 10:
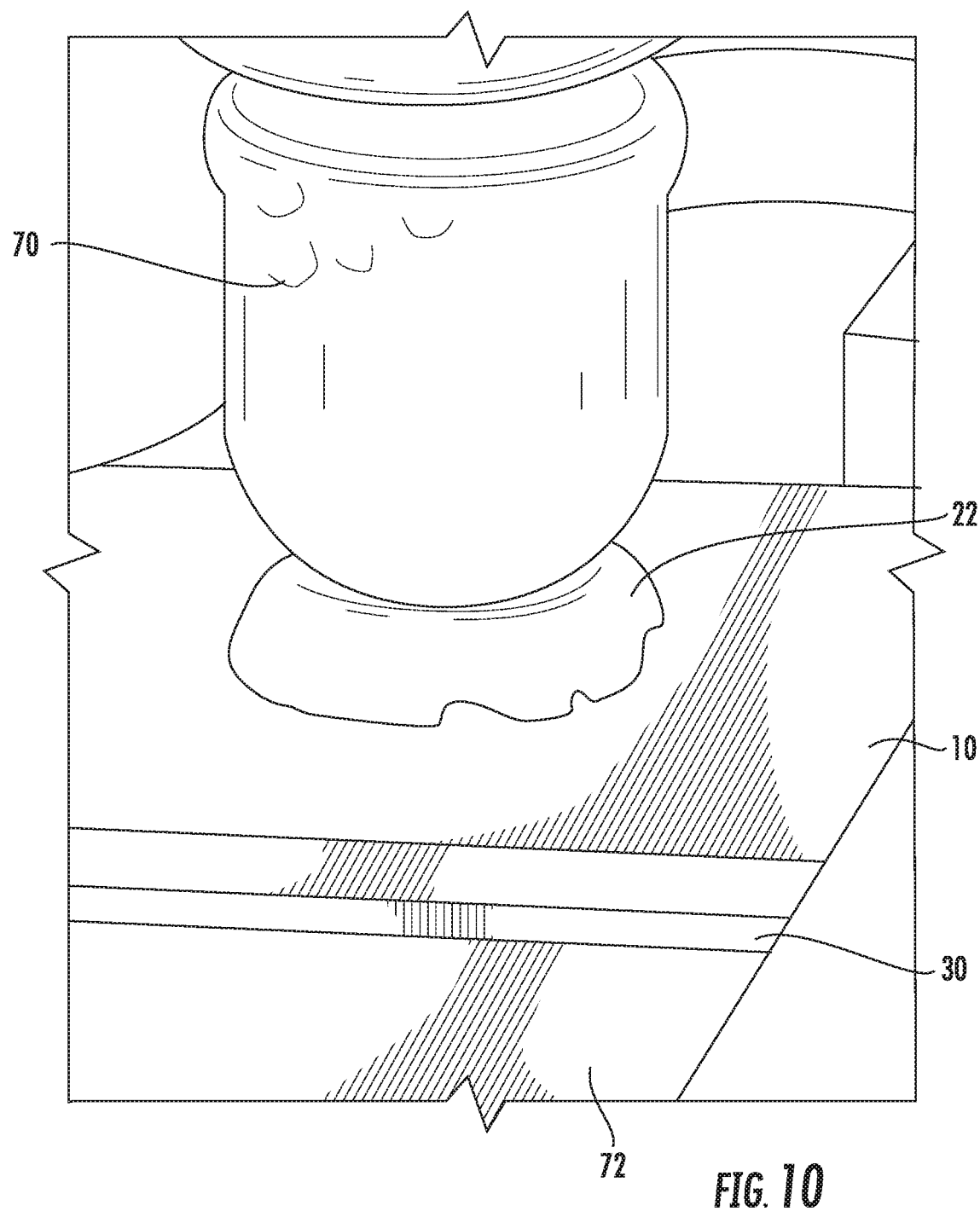
FIG. 10 is a perspective view showing a resistance welding process with a sample aluminum back panel portion and a sample steel tube portion connected by a resistance welded fastener.

FIG. 10 shows a sample aluminum back panel portion 10 and a sample steel tube portion 30. As discussed above, the back panel 10 includes a pilot opening 40 formed in advance. FIG. 10 shows the fastener 20 being spot welded to a tube 32/34 sample profile portion 30. The process includes applying pressure via resistance weld upper electrode 70 and resistance weld lower electrode 72. In practice, the resistance weld lower electrode 72 presses against an opposite tube wall and the current flows around the tube 32/34. The square tubing 32/34 does allow for the necessary clamping pressure to be applied at the opposite tube wall, with the current flowing around the tube to form the weld 24. With the electrodes 70 and 72 applying clamping pressure, the back panel 10 is clamped underneath head 22 of the fastener 20. The rectangular shape back frame tube members 32/34 are also steel. The resulting weld 24 is a steel/steel weld as shown in FIG. 8 and FIG. 9. The resistance weld technology (RSW) is typical used in sheet to sheet welding applications. RSW is utilized according to the invention to weld a fastener 20 to the back frame tube member 32/34 and to also clamp an aluminum back panel 10 underneath the head 22 of the steel fastener 20 to fully form the connection joint.

Friction Weld Fastener

Figure 11:
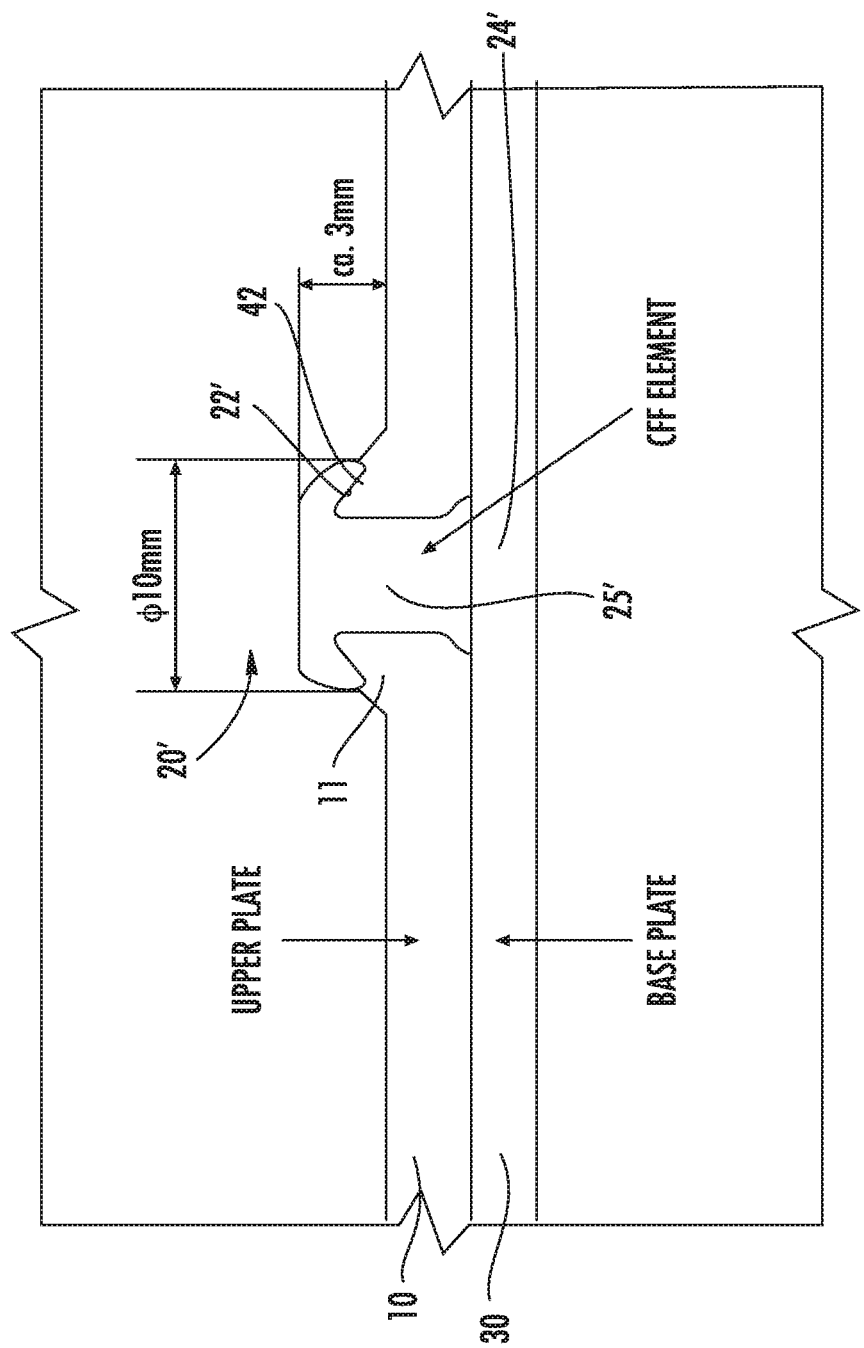
FIG. 11 is a schematic sectional view showing a friction welded fastener that is friction welded to a back frame steel tube with a flanged fastener head mechanically clamping the aluminum back panel.

FIG. 11 schematically shows a connection joint formed with a fastener 20' that is friction welded to the square or rectangular profile tubing 32/34 of the tube back frame 30. As discussed above, the back panel 10 includes a pilot opening 40 formed in advance. The diameter size of the pilot opening may be selected such that the friction welding process pushes some of the material surrounding the opening 40 to interact and provide a better connection with the fastener head 22'. The deformed aluminum material of the peripheral back surface 42, in the region of the opening 40, is shown in the sectional view of FIG. 11, also showing a friction welded fastener 20' friction welded to a back frame steel tube 30. The flanged fastener head 22' is pressed during the friction welding process to provide a mechanical clamping the aluminum back panel 10 with the tube frame 30.

Figure 12A:
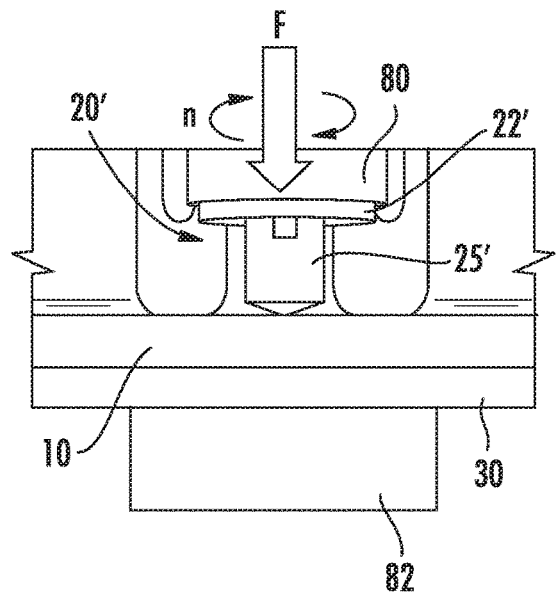
FIG. 12A is a side view showing a stage of a friction welding joining process.
Figure 12B:
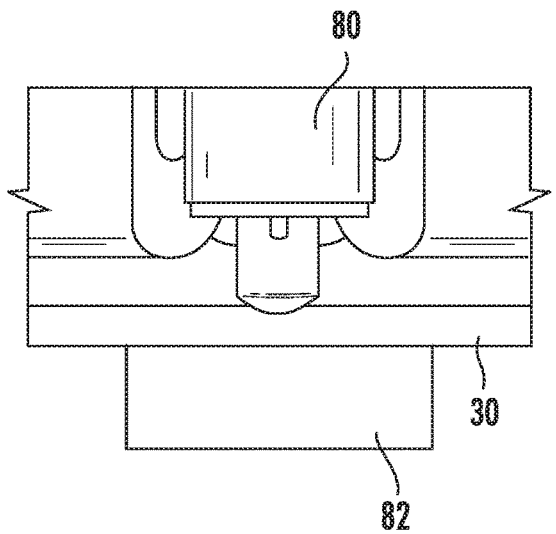
FIG. 12B is a side view showing another stage of a friction welding joining process.
Figure 12C:
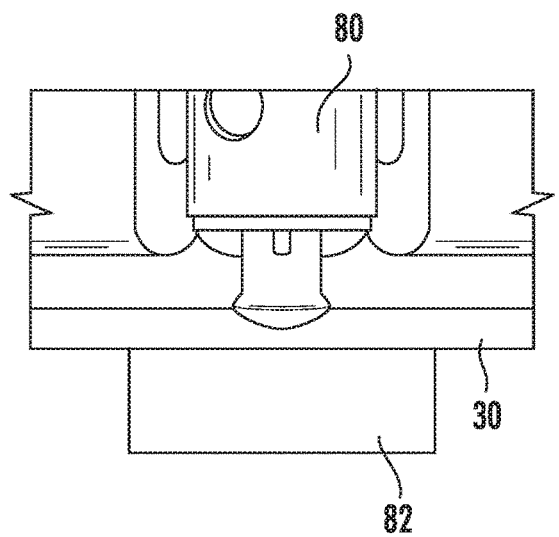
FIG. 12C is a side view showing another stage of a friction welding joining process.
Figure 12D:
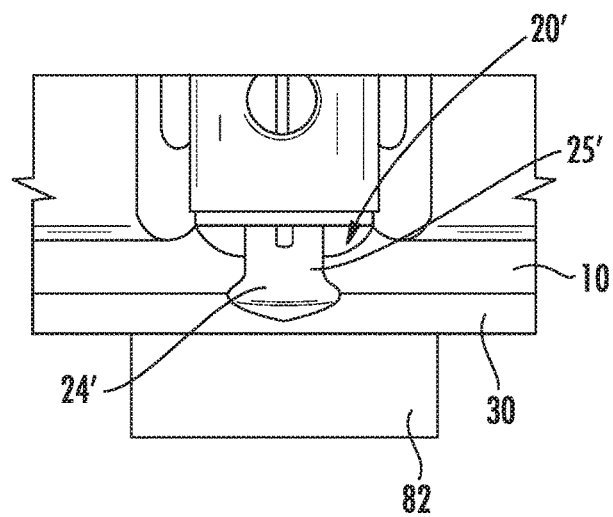
FIG. 12D is a side view showing another stage of a friction welding joining process.

The friction welding process uses a driving bit 80 which rotates and applies force to the fastener 20', with the aluminum back panel 10 in contact with the tube frame 30 and the tube frame 30 backed by anvil 82. As indicated in FIG. 12A, a pressing force is applied from each of the anvil 82 and the driving bit 80 as the driving bit 80 is rotated. This causes the fastener 20' to penetrate into the aluminum back panel 10, through the pilot hole 40. As shown in FIG. 12B, the fastener 20, under the force and action of the driving bit 80, pushes some aluminum material and cleans the contact surface with steel tube frame 30 to activate or initiate welding. Friction welding proceeds without penetration into the steel tube frame 30 as shown in FIG. 12C and with pressing as shown in FIG. 12D. The back frame member 30 is again formed of steel and has a rectangular or square profile. Energy created by rotation of fastener 20', generates friction between fastener 20' and the back fame member 30 with the friction generating heat energy, which welds the fastener 20' to the back frame member 30. The aluminum back panel 10 is clamped underneath the head 22' of the steel fastener 20' and the joint is fully formed. The process provides a particularly advantageous connection joint with the friction welded fastener 20' having a steel/steel weld 24' with the steel tube frame 30 and mechanically clamping the aluminum back panel 10 to the steel tube frame 30.

Blind Rivet Connection

According to a further alternative, a rivet fastener 20" is used to form the mechanical connection joint between the aluminum back panel 10 and the steel tube back frame 30. As shown in FIG. 13, there is first a mechanical drilling operation of the steel tube 30. The steel tube back frame 30 and the back panel 10 are positioned relative to each other. A rivet through hole 95 is drilled with a drill 91 that is connected to a robot drill tool 90. The drill tool may be part of a robot tool head. The tool head of the robot also includes a robot rivet insertion tool/rivet tool 94 to insert a rivet fastener 20". The tool head is switched to the robot rivet insertion tool/rivet tool 94, as shown in FIG. 13C to insert the rivet 20" as shown in FIG. 13B. In a blind rivet operation, the tool 94 stakes (cuts off) the rivet 20" to the undersurface of the steel back frame 30. As can be seen in FIG. 13C, the rivet tool 94 pulls the pigtail 99 of the blind rivet fastener 20", changing the shape at the end 29, while closing the gap between the aluminum back panel 10 and the steel tube back frame 30. This expands the rivet blind end 29 of the rivet fastener 20" and then the mandrel 99 is snapped off. FIG. 13D shows the riveting with the pigtail 99 snapped off at the rivet head by the pulling force of the rivet tool 94, such that the connection joint is fully formed. The riveting process according to the invention is particularly advantageous using such a robot tool wherein essentially all of the steps (the four steps of FIG. 13A-13D) are performed by the same tool head, which indexes from a drilling to a riveting operation. The rivet assembly is inserted into the hole 95 drilled through the parts to be joined and a specially designed tool is used to draw the mandrel into the rivet.

While specific embodiments of the invention have been shown and described in detail to illustrate the application of the principles of the invention, it will be understood that the invention may be embodied otherwise without departing from such principles.

LIST OF REFERENCE CHARACTERS

| | |
|---|---|
| 2 | vehicle seat |
| 4 | backrest |
| 10 | back panel |
| 12 | U-channel |
| 14 | rib raised portion |
| 16 | circular raised portion |
| 18 | planar region |
| 20, 20', 20" | fastener |
| 22, 22', 22" | fastener head |
| 24, 24' | fastener welded end |
| 25, 25', 25" | fastener shaft |
| 29 | rivet blind end |
| 30 | backrest steel tube frame |
| 32 | lateral steel frame tube |
| 34 | horizontal frame tube |
| 40 | fastener weld site/through hole, opening |
| 42 | peripheral back surface |
| 50 | recliner arrangement |
| 52 | recliner/fold forward fixture |
| 54 | recliner pivot |
| 56 | cross tube |
| 58 | side bracket |
| 60 | seat cushion frame |
| 62 | vehicle floor bracket |
| 66 | position adjustment track |
| 68 | position adjustment track |
| 70 | resistance weld upper electrode |
| 72 | resistance weld lower electrode |
| 80 | driving bit |
| 82 | anvil |
| 90 | robot drilling tool |
| 91 | drill |
| 94 | robot pulling tool |
| 95 | drilled hole |
| 99 | rivet pigtail |

What is claimed is:

1. A vehicle seat assembly comprising:
a back panel comprising an aluminum alloy stamped to form an aluminum alloy stamped panel with a periphery and with fastening locations inwardly of the periphery;
a backrest frame comprising steel tubes; and
a plurality of fastening connections fixing the back panel to the backrest frame at the fastening locations, wherein each fastening connection comprises:
a panel passage opening through said aluminum alloy stamped panel;
a fastener formed of steel and comprising a fastening head and a fastener shaft with an end fixed to one of the steel tubes of the backrest frame, the fastening head extending radially outwardly from the fastener shaft and including a contact surface mechanically engaging a surface of the aluminum alloy stamped panel, the fastening head cooperating with the fixed fastener shaft end to clamp the aluminum alloy stamped panel to the backrest frame.

2. A vehicle seat assembly according to claim 1, wherein the aluminum alloy stamped panel comprises a U-channel provided along at least a portion of the periphery with planar regions and raised stamped portions provided inwardly of the periphery.

3. A vehicle seat assembly according to claim 1, wherein the fastener shaft comprises a friction welded end, friction welded to said one of the steel tubes of the backrest frame.

4. A vehicle seat assembly according to claim 1, wherein the fastener shaft comprises a resistance welded end, resistance welded to said one of the steel tubes of the backrest frame.

5. A vehicle seat assembly according to claim 1, wherein:
the fastener comprises a rivet;
each fastening connection further comprises a steel tube passage opening through said one of the steel tubes of the backrest frame;
the fastener shaft passes through the panel passage opening and the steel tube passage opening; and
the rivet has a terminated end including a contact surface mechanically engaging a surface of the said one of the steel tubes of the backrest frame, whereby the rivet clamps the clamp the aluminum alloy stamped panel to the backrest frame.

6. A vehicle seat assembly according to claim 1, wherein the aluminum alloy is in the 5000 series or the 6000 series with a T0-T5 tempering.

7. A vehicle seat assembly according to claim 1, wherein the aluminum back panel has a thickness of between 0.95-0.75 mm.

8. A vehicle seat assembly according to claim 1, wherein the aluminum back panel is between 0.87 and 0.67 Kg and preferably about 0.72 Kg.

9. A process for forming a vehicle seat assembly, the process comprising the steps of:
stamping an aluminum alloy sheet to form an aluminum alloy stamped back panel with a periphery and with fastening locations inwardly of the periphery;
providing a backrest frame comprising steel tubes;
providing a plurality of steel fasteners;
fixing the aluminum alloy stamped back panel to the backrest frame with the fasteners at the fastening locations by forming the fastening connection comprising:
forming a panel passage opening through said aluminum alloy stamped panel;
providing a fastener formed of steel comprising a fastening head and a fastener shaft;
fixing an end of the fastener shaft to one of the steel tubes of the backrest frame with the fastening head extending radially outwardly from the fastener shaft with a contact surface mechanically engaging a surface of the aluminum alloy stamped panel with the fastener head cooperating with the fixed fastener shaft end to clamp the aluminum alloy stamped panel to the backrest frame.

10. A process according to claim 9, wherein the aluminum alloy stamped panel comprises a U-channel provided along at least a portion of the periphery, with planar regions and raised stamped portions provided inwardly of the periphery.

11. A process according to claim 9, wherein the step of fixing comprises friction welding the fastener shaft end to said one of the steel tubes of the backrest frame wherein the fastener shaft friction welded end is friction welded to said one of the steel tubes of the backrest frame.

12. A process according to claim 9, wherein the step of fixing comprises resistance welding the fastener shaft end to said one of the steel tubes of the backrest frame wherein the fastener shaft end is resistance welded to said one of the steel tubes of the backrest frame.

13. A process according to claim 9, wherein the step of fixing further comprises:
providing the fastener as a rivet;
forming a steel tube passage opening through said one of the steel tubes of the backrest frame;
passing the fastener shaft through the panel passage opening and the steel tube passage opening;
terminating a rivet shaft end including the contact surface mechanically engaging a surface of the said one of the steel tubes of the backrest frame, whereby the rivet clamps the clamp the aluminum alloy stamped panel to the backrest frame.

14. A process according to claim 9, wherein the aluminum alloy is in the 5000 series or the 6000 series with a T0-T5 tempering.

15. A process according to claim 9, wherein the aluminum back panel has a thickness of between 0.95-0.75 mm.

16. A process according to claim 9, wherein the aluminum back panel is between 0.87 and 0.67 Kg and preferably about 0.72 Kg.

* * * * *